United States Patent [19]

Lindgren et al.

[11] 4,302,289

[45] Nov. 24, 1981

[54] METHOD OF EXCHANGING FUEL IN A NUCLEAR REACTOR

[75] Inventors: Per Lindgren, Vesteras; Sture Helmersson, Kolback, both of Sweden

[73] Assignee: AB ASEA-Atom, Vesteras, Sweden

[21] Appl. No.: 43,901

[22] Filed: May 30, 1979

[30] Foreign Application Priority Data

Jun. 1, 1978 [SE] Sweden .............................. 7806429

[51] Int. Cl.³ .............................................. G21C 19/20
[52] U.S. Cl. .................... 376/267; 376/444; 376/446; 376/447
[58] Field of Search .............................. 176/17, 30, 94

[56] References Cited

U.S. PATENT DOCUMENTS

| | | | |
|---|---|---|---|
| 2,856,337 | 10/1958 | Untermyer | 176/30 |
| 3,336,201 | 8/1967 | Graham | 176/30 |
| 3,928,128 | 12/1975 | Kollmar | 176/30 |

Primary Examiner—Donald P. Walsh
Attorney, Agent, or Firm—Watson, Cole, Grindle & Watson

[57] ABSTRACT

A method of refueling a nuclear reactor having a core containing a plurality of fuel rod bundles which are built up from a plurality of fuel rods includes replacing at least one burnt up fuel rod bundle with a fuel rod bundle which is at least partly composed of fuel rods from other fuel rod bundles burnt up in the reactor, the mean content of fissile material in the fuel rod bundle thus composed being higher than the mean content of fissile material in the fuel rod bundle which is replaced by the composed fuel rod bundle.

7 Claims, 8 Drawing Figures

FIG. 2

| 1,18 | 1,18 | 1,18 | 1,18 | 1,85 | 1,85 | 1,85 | 1,85 |
|------|------|------|------|------|------|------|------|
| 1,18 | 1,18 | 1,85 | 1,85 | 2,50 | 2,50 | 2,50 | 1,85 |
| 1,18 | 1,85 | 1,85 | 2,50 | 2,50 | 3,07 | 3,07 | 2,50 |
| 1,18 | 1,85 | 2,50 | 1,85 | 1,85 | 3,07 | 3,07 | 3,07 |
| 1,85 | 2,50 | 2,50 | 1,85 | 1,85 | 3,07 | 3,07 | 3,07 |
| 1,85 | 2,50 | 3,07 | 3,07 | 3,07 | 3,07 | 3,07 | 3,07 |
| 1,85 | 2,50 | 2,50 | 3,07 | 3,07 | 3,07 | 3,07 | 2,50 |
| 1,85 | 1,85 | 2,50 | 3,07 | 3,07 | 3,07 | 2,50 | 1,85 |

FIG. 3

| 0,15 / 0,39 | 0,21 / 0,41 | 0,25 / 0,43 | 0,29 / 0,45 | 0,51 / 0,46 | 0,52 / 0,46 | 0,50 / 0,46 | 0,45 / 0,45 |
|---|---|---|---|---|---|---|---|
| 0,21 / 0,41 | 0,29 / 0,42 | 0,57 / 0,45 | 0,65 / 0,47 | 0,97 / 0,48 | 0,98 / 0,49 | 0,95 / 0,48 | 0,61 / 0,48 |
| 0,25 / 0,43 | 0,57 / 0,45 | 0,69 / 0,48 | 1,07 / 0,51 | 1,14 / 0,52 | 1,45 / 0,52 | 1,12 / 0,51 | 1,01 / 0,51 |
| 0,29 / 0,45 | 0,65 / 0,47 | 1,07 / 0,51 | 0,86 / 0,53 | 0,91 / 0,55 | 1,58 / 0,55 | 1,54 / 0,54 | 1,38 / 0,54 |
| 0,51 / 0,46 | 0,97 / 0,48 | 1,14 / 0,52 | 0,91 / 0,55 | 0,95 / 0,56 | 1,63 / 0,56 | 1,58 / 0,55 | 0,41 / 0,55 |
| 0,52 / 0,46 | 0,98 / 0,49 | 1,45 / 0,52 | 1,58 / 0,55 | 1,63 / 0,56 | 1,62 / 0,56 | 1,55 / 0,55 | 1,35 / 0,55 |
| 0,50 / 0,46 | 0,95 / 0,48 | 1,12 / 0,51 | 1,54 / 0,54 | 1,58 / 0,55 | 1,55 / 0,55 | 1,44 / 0,54 | 0,98 / 0,55 |
| 0,45 / 0,45 | 0,61 / 0,48 | 1,01 / 0,51 | 1,38 / 0,54 | 1,41 / 0,55 | 1,35 / 0,55 | 0,98 / 0,55 | 0,61 / 0,53 |

FIG. 4

| 0,61 / 0,53 | 0,98 / 0,55 | 1,35 / 0,55 | 1,41 / 0,55 | 1,38 / 0,55 | 1,12 / 0,51 | 0,50 / 0,46 | 0,45 / 0,45 |
|---|---|---|---|---|---|---|---|
| 0,98 / 0,55 | 1,44 / 0,54 | 1,63 / 0,56 | 1,58 / 0,55 | 0,97 / 0,48 | 1,58 / 0,55 | 1,55 / 0,55 | 0,61 / 0,48 |
| 1,35 / 0,55 | 1,63 / 0,56 | 1,62 / 0,56 | 1,07 / 0,51 | 1,14 / 0,52 | 1,45 / 0,52 | 1,12 / 0,51 | 1,01 / 0,51 |
| 1,41 / 0,55 | 1,58 / 0,55 | 1,07 / 0,51 | 0,95 / 0,56 | 1,45 / 0,52 | 1,58 / 0,55 | 1,54 / 0,55 | 1,38 / 0,54 |
| 1,38 / 0,54 | 0,97 / 0,48 | 1,14 / 0,52 | 1,45 / 0,52 | 0,95 / 0,56 | 1,63 / 0,56 | 1,58 / 0,55 | 1,41 / 0,55 |
| 1,12 / 0,51 | 1,58 / 0,55 | 1,45 / 0,52 | 1,58 / 0,55 | 1,63 / 0,56 | 1,62 / 0,56 | 1,55 / 0,55 | 0,98 / 0,55 |
| 0,50 / 0,46 | 1,55 / 0,55 | 1,12 / 0,51 | 1,54 / 0,54 | 1,58 / 0,55 | 1,55 / 0,55 | 1,44 / 0,54 | 0,98 / 0,55 |
| 0,45 / 0,45 | 0,61 / 0,48 | 1,01 / 0,51 | 1,38 / 0,54 | 1,41 / 0,55 | 0,98 / 0,55 | 0,98 / 0,55 | 0,61 / 0,53 |

METHOD OF EXCHANGING FUEL IN A NUCLEAR REACTOR

BACKGROUND OF THE INVENTION

A nuclear reactor core normally contains several hundred fuel rod bundles. Each fuel rod bundle consists of a plurality of fuel rods. Boiling water reactors normally use fuel rod bundles containing 8"×8" fuel rods; sometimes 6"×6", 7"×7" or 9"×9" fuel rods are used. Pressurized water reactors use fuel rod bundles containing 15"×15", 16"×16" or 17"×17" fuel rods. One or more of these fuel rods may be substituted by inert rods or tubes having a different function than producing energy. Each fuel rod contains a large number of fuel pellets stacked on top of one another in a cladding tube, which is normally of a zirconium alloy known as "Zircaloy." In each fuel rod bundle the fuel rods are arranged between a bottom and a top plate, to which some fuel rods, so-called tie rods, are secured. In a boiling water reactor the fuel rod bundle is surrounded by a fuel channel, which is normally of "Zircaloy." Inside the channel the fuel rods are kept at the desired distance from each other in the lateral direction by spacers located at suitable distances in the vertical direction.

When the burn-up in a reactor has progressed so far that the smallest acceptable core reactivity margin has been reached, a partial recharge of fuel is carried out. By balancing, in a suitable manner, the fuel quantity to be replaced as well as the fissile enrichment of the replacement fuel, an excess reactivity is realized that permits a certain energy output until the next refuelling occasion. During the partial recharge of a boiling water reactor, it is possible to exchange, for example, one-fifth of the fuel each operating year (or any other suitable operating period), as normally from the end of the second year of operation. This means that the fuel for example remains in the core for 5 years during equilibrium conditions, but that the part of the fuel that is exchanged during the initial state is used for a shorter period of 3 to 4 years.

So far, refuelling has always been performed in such a manner that irradiated fuel rod bundles have been removed from the core and that new fuel rod bundles with unirradiated fuel have been inserted into the empty spaces formed, usually after a suitable relocation of the remaining fuel rod bundles within the core. This relocation of fuel rod bundles is done in order that the reactor may have an optimum power distribution within the core and may have optimum reactivity. The irradiated fuel rod bundles which have been removed from the reactor core then proceed to storage, awaiting ultimate reprocessing for utilizing the remaining fissile material.

SUMMARY OF THE INVENTION

The present invention is based on the realization that it is possible to make considerable savings of fuel costs by composing new fuel rod bundles out of fuel rods from already burnt-up fuel rod bundles and using the fuel rod bundles thus composed for an additional or a few additional operating periods in the reactor. The fuel cost savings per year which can be thus accomplished are considerable for each reactor.

The present invention relates more particularly to a method of refuelling in a nuclear reactor having a core containing a plurality of fuel rod bundles which are built up from a plurality of fuel rods, the method being characterized in that at least one burnt-up fuel rod bundle is replaced by a fuel rod bundle which is at least partially composed of fuel rods from fuel rod bundles already burnt-up in a reactor, the mean content of fissile material in the fuel rod bundle thus composed being higher than the mean content of fissile material in the fuel rod bundle which is replaced by such composed fuel rod bundle in the reactor.

For light-water boiling reactors using uranium dioxide and possibly plutonium dioxide as fuel, the burnt-up rod fuel bundles which are used when putting together the new fuel rod bundle have preferably a maximum content of fissile material in the form of U 235, Pu 239 and Pu 241 of 1.75% of the initial total weight of uranium and possibly plutonium in the fuel. The content of the fissile material, however, should not be below 1.20% of the initial weight. To utilize the invention in full, during refuelling in this way, at least some twenty or so burnt-up fuel rod bundles in the reactor should be replaced with fuel rod bundles composed in the manner described.

For optimum utilization of the fuel in the new composite fuel rod bundle, the different fuel rods are located in the new composite fuel rod bundle so that the resulting internal power peaking factor, i.e., the ratio of the maximum local value of the rod power and its mean value in a horizontal section through the fuel rod bundle, is at least 1.20 and preferably 1.30 to 1.50.

To put together a composed fuel rod bundle from already burnt-up fuel rod bundles according to the invention, preferably some fuel rods are removed from one fuel rod bundle already burnt-up in a reactor and fuel rods from one or more of other already burnt-up fuel rod bundles are inserted into empty locations in the first fuel rod bundle, the last-mentioned fuel rods having a higher mean content of fissile material than those removed from the first-mentioned fuel rod bundle. At the same time a rearrangement can be made of the fuel rods which have been kept in the fuel rod bundle from which some fuel rods were first taken out, so as to achieve an optimum power distribution in this fuel rod bundle. When putting together the composed fuel rod bundle it is suitable to retain such fuel rods in the first fuel rod bundle that constitute supporting elements in this fuel rod bundle. Also spacers, spacer holder rods, and top and bottom plates are preferably retained in the fuel rod bundle.

According to one embodiment of the invention, when putting together a new fuel rod bundle, open tubes—to be water-filled inside the reactor—are used instead of fuel rods in some positions for fuel rods in the fuel rod bundle, or empty spaces are left in these positions, to be occupied by water in the reactor. Such a measure, as will be explained in more detail in the following, may influence the burn-up of the fuel in an advantageous manner.

In connection with putting together a composed fuel rod bundle one or more rods or tubes containing burnable neutron absorber material such as gadolinium, boron or samarium distributed in a carrier material such as uranium dioxide, zircaloy or steel may be placed in some positions for fuel rods in the fuel rod bundle instead of fuel rods. In this way it is possible to achieve an improved reactivity control during the earlier part of the operating period and to simultaneously obtain at the end of the operating period a favorable influence similar to that obtained with a water-filled tube.

According to another embodiment of the invention relating to reactors having vertical fuel rods, when putting together a new fuel rod bundle at least some of the fuel rods, preferably those which are located centrally, are arranged with those ends facing upwardly that previously in a reactor were facing downwardly. In a boiling water reactor the high content of steam bubbles at the upper part of the core results in the neutron flux being somewhat depressed there so that the fissile material is consumed more slowly than in parts located at a lower core level. It is therefore possible, when putting together composed fuel rod bundles, to increase the energy output from a boiling water reactor by turning some of the fuel rods from burnt-up fuel rod bundles upside down when reinserting them into composed fuel rod bundles. This embodiment entails advantages also for pressurized water reactors, among other things, because of the fact that the coolant shows a density gradient in the longitudinal direction of the fuel rods.

BRIEF DESCRIPTION OF THE DRAWINGS

FIG. 2 schematically illustrates a bundle of fuel rods in the reactor core according to FIG. 1, in which bundle an initial content of fissile material consisting of U 235 is included therein;

FIG. 3 illustrates the same fuel rod bundle as in FIG. 2 but after three operating years, it sets forth the content of fissile material in the form of U 235 and in the form of the total amount of Pu 239 and Pu 241;

FIG. 4 illustrates a new fuel rod bundle composed of the fuel rod bundle according to FIG. 3 by removal of a number of fuel rods;

FIGS. 5 and 6 are the same as FIG. 3 but show the crossed fuel rods of FIG. 5 replaced by the circled fuel rods of FIG. 6 to arrive at the new fuel rod bundle of FIG. 4; and FIG. 7 is similar to FIG. 4 but shows a fuel rod bundle containing water-filled tubes instead of fuel rods in certain positions.

DETAILED DESCRIPTION OF THE INVENTION

Figure 1:
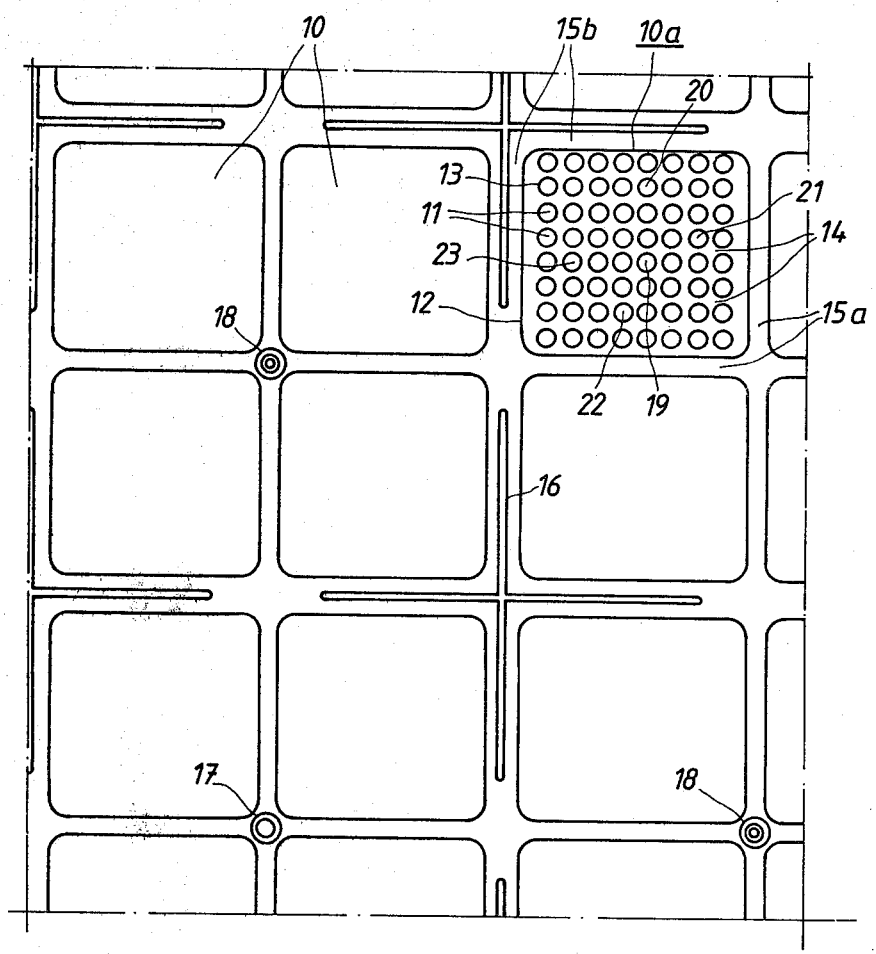
FIG. 1 is a horizontal sectional view of part of a reactor core of a light-water boiling reactor type.
Figure 1A:
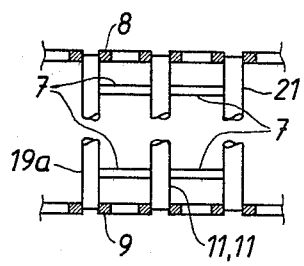
FIG. 1A is a vertical sectional view taken through a portion of FIG. 1, showing some of the details of the fuel rod supports.

Turning now to the drawings wherein like reference characters refer to like and corresponding parts throughout the several views, FIG. 1 illustrates a small portion of a horizontal section of a reactor core of a boiling water reactor having vertical fuel rod bundles. The reactor core section contains nine whole fuel rod bundles 10, although only one of such bundle is illustrated in the interest of clarity. The total number of fuel rod bundles in a complete cross-section amounts to several hundred. Each fuel rod bundle, for example 10a, is built up of sixty-four fuel rods 11 in the form of a square lattice. The fuel rod bundle is contained within a fuel channel 12 having a substantially square cross-section and being of a zirconium alloy material known as the "Zircaloys" or specifically "Zircaloy 4." The rods are held in their respective positions by so-called spacers 7 equally spaced between and parallel to top and bottom plates 8 and 9 of the fuel rod bundle (see FIG. 1A). Each fuel rod contains a number of pellets of uranium dioxide as fuel, stacked on top of one another and enclosed in a tube 13 of a zirconium alloy material known as the "Zircaloys", or specifically "Zircaloy 2." Spaces 14 between the fuel rods within the fuel channel are traversed in any normal manner by a coolant, as for example, light water. Gaps 15a and 15b between the fuel channels are also traversed in a normal manner by a coolant of the same type. The gaps 15b, into which control rods 16 can be inserted, are wider than the gaps 15a which contain no control rods. The reactor core cross-section also contains neutron sources 17 as well as neutron detectors 18. One or more of the fuel rods may be replaced with a non-energy producing rod, as described hereinabove. Thus, for example, a rod or rods such as 19 could be replaced with a solid or water-filled spacer holder rod 19a of "Zircaloy 2." Fuel rods 20, 21, 22 and 23 are, for example, fixed to the top and bottom plates 8 and 9 in the fuel rod bundle as shown, for example, in FIG. 1A.

The spacing between the fuel rods in a bundle is primarily determined by the reactor physics demands with regard to optimum neutron economy, as well as the neutron-multiplying and thermo-hydraulic and dynamic properties of the core. In choosing the distance between the rods allowance is also made for the effect of the additional water in the gaps 15a and 15b between the fuel channels, which is of great importance for the local variations in the neutron flux. This water results in a locally increased neutron flux so that fuel rods located near the water gaps tend to be subjected to higher heat loads than other fuel rods. To equalize the power distribution within the fuel rod bundle as much as possible, fuel rods with different concentrations of fissile material, for example U 235, are used in different positions within the fuel rod bundle. FIG. 2 schematically illustrates a fuel rod bundle with the initial contents of U 235 in different fuel rods being expressed as a percentage of the initial weight of uranium in the fuel (uranium dioxide). (The percentages set forth in the following also relate to the percentage of the initial weight of uranium in the fuel.) The average fissile enrichment in the FIG. 2 example is 2.32%. Four different contents of enrichment are used when designing the fuel rod bundle, namely 1.18%, 1.85%, 2.50% and 3.07%. In the interest of clarity, the fuel rods themselves are not illustrated in FIG. 2; only their degrees of enrichment.

FIG. 3 schematically illustrates the same fuel rod bundle of FIG. 2 but after three operating years. The upper numeral 24 in each square sets forth the enrichment content U 235 in percent, and the lower numeral 25 sets forth the total enrichment content of Pu 239 and Pu 241 in percent of each fuel rod in the fuel rod bundle. The plutonium has been formed under operation by capturing neutrons in U 238. The higher neutron flux previously mentioned and the consequently higher power in the rods at the water gaps 15a and 15b have resulted in the fissile material, mainly U 235, Pu 239 and Pu 241, having been consumed more rapidly here than in the central parts of the fuel rod bundle, as can be seen. With time this enhances the original enrichment distribution, and the power distribution over the fuel rod bundle is flattened, which in principle is favorable. The average content of U 235, which was initially 2.32%, is after three years of operation 0.96% and the average content of the total amount of Pu 239 (0.44%) and Pu 241 (0.07%) is 0.51%. Fission of a U 235 nucleus and a Pu nucleus provides approximately the same energy yield. The amount of fissile material in the bundle has thus been reduced to about 60% of the initial amount.

The remaining fissile material is also differently distributed over the fuel rods included in the fuel rod bundles. In accordance with the technique heretofore applied, irradiated fuel rod bundles according to FIG. 3 have as a whole proceeded to storage, awaiting ultimate reprocessing for utilization of the fissile material.

Figures 5, 6, 7:
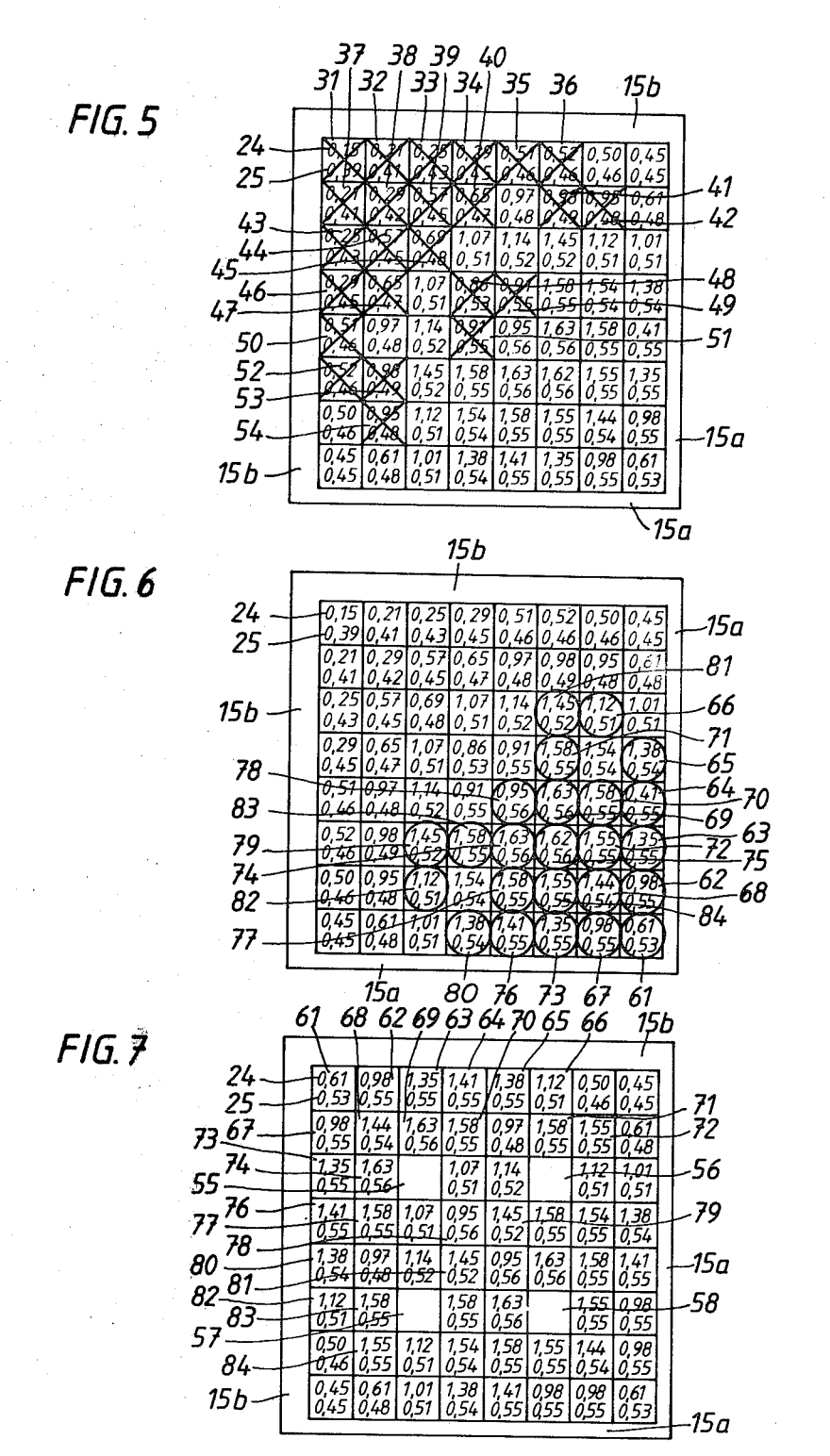

According to the present invention, on the other hand fuel rods in already burnt-up fuel rod bundles, for example of the type shown in FIG. 3, are used for composing reloaded fuel rod bundles. One example of such a fuel rod bundle is schematically illustrated in FIG. 4. This bundle has been composed from two fuel rod bundles which have been in operation for three years and which both have a distribution of enrichment as shown in FIG. 3. Twenty-four fuel rods, designated 31 to 54 and marked by an "X" in FIG. 5, have been removed from such a fuel rod bundle. Twenty-four encircled fuel rods, designated 61 to 84 in FIG. 6 are removed from this other bundle and are substituted for the removed rods of FIG. 5 to arrive at the new FIG. 4 bundle in an arrangement made clear from the drawing. Of course, it is possible to move fuel rods in the fuel rod bundle according to FIG. 5 after the removal of the marked fuel rods before fuel rods from the fuel rod bundle in FIG. 6 are inserted. When putting together the composed fuel rod bundle according to FIG. 4, such fuel rods in the fuel rod bundle according to FIG. 5 which have principally been replaced are located nearest to wide water gaps 15b where the enrichment of fissile material is lowest. The above-described substitution of fuel rods results in the average content of fissile material increasing from 0.96% for U 235 and 0.51% for Pu 239 and Pu 241 together in the fuel rods according to FIG. 3, to 1.26% for U 235 and to 0.53% for Pu 239 and Pu 241 together in the fuel rods according to FIG. 4. The internal power peaking factor for the composed fuel rod bundle according to FIG. 4 amounts to 1.40. Fuel rod bundles according to FIG. 4 can be used for operation for an additional year or a few years, which results in a considerable reduction of the fuel costs for the reactor.

The neutron-multiplying properties of the core are greatly dependent on the volumetric relation between water and fuel. The optimum water/fuel ratio varies with fuel burn-up. Since the technical limit to the maximum extent of the burn-up is determined by the point where the contribution of the fuel to the neutron multiplication of the core becomes too small, an optimum water/fuel volume ratio is important. The volume ratio water/fuel can be increased by replacing one or more fuel rods in the central parts of the fuel rod bundle with open empty tubes to be water-filled in the reactor. This, of course, reduces the amount of fissile material, but the possibilities of utilizing the remaining material increase considerably and compensate more than enough for the material loss. FIG. 7 schematically illustrates the manner in which fuel rods in the fuel rod bundle according to FIG. 4 have been replaced with water-filled tubes, marked by empty squares 55, 56, 57 and 58, at the central portions of the fuel rod bundle. One or more of these tubes may be replaced with a rod or rods containing a burnable neutron absorber, e.g., gadolinium distributed in uranium dioxide or "Zircaloy" as a carrier material.

In the application of the previously mentioned embodiment of the invention, in which at least some of the fuel rods from burnt-up fuel rod bundles, when putting together new fuel rod bundles, were turned so that those ends which had been facing downwardly in the burnt-up fuel rod bundles were facing upwardly in the new fuel rod bundle, all fuel rods which are not supporting and which are not located adjacent the water gaps 15a and 15b may, for example, be positioned in the manner described. The method offers particular advantages when applied to fuel rods at the central portions of the fuel rod bundle.

The invention has been described in particular for application to a light water boiling reactor. However, it is also applicable to heavy water boiling reactors and to pressurized water reactors and to other reactors where the fuel is arranged in the form of fuel rod bundles, without departing from the scope of the invention.

Obviously, many other modifications and variations of the present invention are made possible in the light of the above teachings. It is to be therefore understood that the invention may be practiced otherwise than as specifically described.

We claim:

1. Method of refuelling in a light water boiling nuclear-reactor having a core containing a plurality of fuel rod bundles which are built up from a plurality of fuel rods, comprising the steps of replacing at least one burnt-up fuel rod bundle with a fuel rod bundle which is at least partly composed of fuel rods from burnt-up fuel rod bundles from said reactor, and of selecting, when composing said composed fuel rod bundle for said light-water boiling reactor having uranium dioxide and any plutonium dioxide as fuel, said burnt-up fuel rod bundles having a maximum content of fissile material in the form of U 235, Pu 239 and Pu 241 of 1.75% of the initial weight of uranium and any plutonium in the fuel the mean content of fissile material in the fuel rod bundle thus composed being higher than the mean content of fissile material in the fuel rod bundle which is replaced by said composed fuel rod bundle.

2. Method according to claim 1, wherein said replacing step is carried out by removing a number of fuel rods from a first burnt-up fuel rod bundle and inserting a number of fuel rods from at least one second burnt-up fuel rod bundle into said first burnt-up fuel rod bundle, said fuel rods thus inserted having a higher average content of fissile material than said fuel rods which have been removed from the first fuel rod bundle.

3. Method according to claim 2, wherein said removing and inserting steps include the step of retaining fuel rods in the first fuel rod bundle which function as supporting elements in the first fuel rod bundle.

4. Method according to claim 2, wherein said removing and inserting steps include the step of retaining spacers, spacer holder rods and top and bottom plates in the first fuel rod bundle.

5. Method according to claim 1, wherein said composed fuel rod bundle includes water-filled tubes placed in selected positions thereof instead of fuel rods.

6. Method according to claim 1, wherein said composed fuel rod bundle includes vertical fuel rods at least several of said vertical fuel rods being arranged with ends thereof facing upwardly which had been facing downwardly in said burnt-up bundles.

7. Method according to claim 1, wherein said composed fuel rod bundle includes selected fuel rod positions thereof being maintained empty.

* * * * *